United States Patent [19]
Penniman et al.

[11] Patent Number: 5,734,550
[45] Date of Patent: Mar. 31, 1998

[54] COMPUTER HAVING A HEAT TRANSFER SYSTEM OPERABLY CONNECTED DURING ASSEMBLY OF A COMPUTER KEYBOARD UPON THE COMPUTER

[75] Inventors: Mark B. Penniman, Austin; Carmen M. Schlesener, Pflugerville; Jim J. Kizer, Austin, all of Tex.

[73] Assignee: Dell USA, L.P., Round Rock, Tex.

[21] Appl. No.: 412,335

[22] Filed: Mar. 29, 1995

[51] Int. Cl.⁶ ............................................. H05H 7/20
[52] U.S. Cl. .................. 361/687; 165/80.3; 165/185; 174/15.2; 361/704; 361/720
[58] Field of Search .................. 165/80.2, 80.3, 165/80.4, 185; 174/16.3, 15.2; 257/706, 707, 710, 711–714; 361/687, 689–690, 699, 707, 709–711, 715, 717–722

[56] References Cited

U.S. PATENT DOCUMENTS 5,191,512  3/1993  Ogura et al. ...................... 361/720
5,402,311  3/1995  Nakajima ........................... 361/687
5,430,609  7/1995  Kikinis ............................... 361/711
5,513,070  4/1996  Xie et al. ............................ 361/720

OTHER PUBLICATIONS

Thermacore Inc. Product Data Guide, "Pentium™Processor Thermal Management System", Nov. 19, 1994.

*Primary Examiner*—Gregory D. Thompson

[57] ABSTRACT

A thermal transfer circuit is provided for dissipating thermal energy within a personal computer. The thermal transfer circuit is formed during assembly of the personal computer. Specifically, the thermal transfer circuit is formed when a computer keyboard is fixed upon a portable computer base. The computer keyboard serves as a heat sink and a coupling mechanism is provided between the heat source (CPU) and the heat sink keyboard. The coupling mechanism includes flat side portions which are in lateral registry with each other and which abut together during assembly of the keyboard upon the computer base. Abutment of the side portions effectuates completion of the keyboard assembly to the computer base as well as completion of a thermal transfer circuit extending from the CPU to the computer keyboard.

14 Claims, 8 Drawing Sheets

COMPUTER HAVING A HEAT TRANSFER SYSTEM OPERABLY CONNECTED DURING ASSEMBLY OF A COMPUTER KEYBOARD UPON THE COMPUTER

BACKGROUND OF THE INVENTION

1. Field of the Invention

This invention relates to a personal computer and more particularly to an improved thermal transfer circuit which operates to dissipate heat from a central processing unit (CPU) to a computer keyboard upon keyboard assembly to the personal computer housing.

2. Background of the Relevant Art

A computer system is one which, at a minimum, includes an input/output (I/O) port, a central processing unit (CPU), a read only memory (ROM), a random access memory (RAM), an address bus, a control bus, and a data bus. Depending upon its complexity, a computer system can be classified as a mainframe, a minicomputer or a microcomputer. Mainframe computers, often termed supercomputers, have in many instances today been replaced by smaller, less costly minicomputers. The term minicomputer is therefore used to denote a general purpose personal computer used for computation, process control, word processing, etc. Many workstation minicomputers use graphic-intensive programs and are therefore used for more specialized functions such as computer-aided design (CAD) and computer-aided engineering (CAE). A minicomputer typically employs a motherboard having separate I/O control, CPU, ROM and RAM integrated circuits arranged upon the motherboard. A microcomputer, on the other hand, generally incorporates I/O control, CPU, ROM and RAM functions on a single monolithic silicon substrate. Depending upon its application, a single chip microcomputer is often denoted as a microcontroller (MCU).

Regardless of the type of computer system used, the CPU often generates large amounts of thermal energy (or heat) during its operation. Advances in CPU speed and bus throughput have further compounded this problem. Large mainframe computers are usually cooled by forcing cool air or liquid coolant over the CPU heat source. A microcomputer, on the other hand, is generally designed to operate at lower voltages and/or speed, thereby avoiding higher temperature operation. Constrained to application performance demands, a minicomputer, however, must operate at higher speeds and voltages than a microcomputer. Yet, a minicomputer is not afforded the high costs necessary to cool supercomputing mainframes.

Most minicomputers of the desktop variety are thermally managed by forcing air across the motherboard and particularly across the CPU. Forcing air in such a manner requires a fan placed upon the minicomputer chassis and, in some instances, an additional fan placed directly above the CPU. In lieu of or in addition to a fan, many computer manufacturers often couple a heat sink structure to the upper surface of the CPU. The heat sink is generally made of a metal having opposed surfaces, wherein one surface is mostly flat while the other surface includes a plurality of outward-extending fins. The flat surface is thermally bonded to the encapsulated CPU, allowing the fins to project into the air flow stream carried through the minicomputer chassis. A silicon compound is normally used as the thermal bonding agent. The metal fins function similarly to a metal radiator in that they remove heat from the thermally bonded, underlying CPU by means of conduction, convection and radiation.

Fans and heat sinks provide a cost effective mechanism for thermally managing many types of minicomputer systems. Fans, however, require power and heat sinks require space. While power and space are generally in abundant supply in desktop-type minicomputers, portable minicomputers (often termed "laptop computer") have only a limited supply of both power and space. A commercial advantage is achieved by manufacturing portable computer that are both small and lightweight. Further, portable computers must operate with power conservation in mind. An operable fan would unduly draw upon the batteries of a laptop making it unattractive for long periods of battery-operated use.

A need therefore exists for a thermal management system within a portable computer which is both cost effective and operably superior to conventional fans and finned heat sinks. Thermal management of portable computers has become an even more important consideration with the advent of higher speed CPUs, or CPUs having advanced 32-bit and 64-bit bus structures. As an example, Pentium®-based CPUs generate considerably more thermal energy than predecessor x386 and x486 CPUs. In order to effectively use a Pentium®-based CPU within a portable computer, it becomes necessary that heat be efficiently drawn away from the CPU without using bulky finned heat sinks and power consumptive fans.

Conventional CPU-coupled finned heat sinks necessary to cool modern day CPUs must be quite large. Portable computers which do not use a cooling fan must therefore employ an even larger heat sink. For proper thermal coupling to the CPU, conventional heat sinks occupy a relatively large amount of space adjacent the CPU within the portable computer housing. In small outline portable computers, the CPU-embodied motherboard is spaced too close to the underlying base and overlying keyboard to allow coupling of an effective conventional heat sink. As portable computers are commercially downsized, the spacings between the motherboard and underlying base and overlying keyboard are also downsized. The evolution to higher speed, higher performance, smaller portable computers is therefore constrainted by cooling problems inherent in the portable computer configuration and operation.

SUMMARY OF THE INVENTION

The problems outlined above are in large part solved by an improved thermal transfer circuit of the present invention. The thermal transfer circuit operates within the constraints of closely spaced components within a portable minicomputer. Specifically, the thermal transfer circuit is designed to accommodate limited space between the motherboard and overlying keyboard. In fact, the present thermal transfer circuit purposefully relies upon closeness in spacing between the motherboard and overlying keyboard. The transfer circuit is therefore well suited for portable minicomputer applications.

As defined herein "thermal transfer circuit" is a thermally conductive path extending along a circuit defined by couplings of mechanical components within that circuit. A thermal circuit is therefore one which extends from a thermal (heat) source to a thermal (heat) sink. A majority of the heat developed within a portable computer arises from the CPU. Therefore, the CPU represents the thermal source. The thermal transfer circuit according to the present design therefore extends from the CPU to a heat sink advantageously chosen to be part of the computer keyboard. Thermal transfer efficiency is maximized by spacing the computer keyboard close to the CPU-embodied motherboard and choosing an entire planar surface of the computer keyboard as the heat sink.

The thermal transfer circuit is completed in stages. Namely, thermally conductive edges are formed upon respective sides of the computer keyboard and motherboard. The keyboard-associated edge is removeably coupled to a downwardly facing metal surface which extends across the computer keyboard. The motherboard-associated edge is removeably coupled to an upwardly facing surface of the motherboard. The keyboard-associated and motherboard-associated edges are laterally aligned with one another. During assembly of the portable computer, at the stage where the computer keyboard is coupled to the portable computer housing, the keyboard and keyboard-associated edge are designed to move laterally upon the portable computer housing such that the keyboard-associated edge abuts in thermal contact with the motherboard-associated edge. After both edges are placed in abutment with each other, the thermal transfer circuit is completed, wherein the thermal transfer circuit extends from the CPU, through the abutted edges, and into the metal layer backing of the portable computer keyboard.

The thermal transfer circuit is purposefully formed during the assembly of a portable computer. As the keyboard is assembled onto the base of the portable computer, the keyboard moves in a lateral direction relative to the base. At the termination of the lateral movement, the keyboard latches upon the base, and thus the keyboard-associated edge and the motherboard-associated edge are in abutment. Accordingly, the thermal transfer circuit is completed upon latched mating of the computer keyboard to the computer base.

The thermal transfer circuit comprises a heat slug thermally coupled to the CPU, and a heat exchange vessel thermally coupled to the metal plate of the computer keyboard. The heat slug includes a protrusion having a flat edge extending substantially perpendicular to the motherboard. Likewise, the heat transfer vessel includes a flat side portion which extends substantially perpendicular to the metal plate of the computer keyboard. The flat edges of the heat slug and heat transfer vessel thereby extend toward one another, whereby lateral movement of one edge (during portable computer assembly) will force abutment and thermal joinder of those edges.

Broadly speaking, the present invention contemplates a system for cooling a computer. The system includes a heat source connected to a printed circuit board, or motherboard, arranged within a computer housing. The system further includes a heat sink connected upon a computer keyboard. The heat source and heat sink are arranged in lateral alignment with each other, whereby a side portion (or edge) of the heat source thermally couples during assembly of the computer with a side portion (or edge) of the heat sink. The heat source is a CPU, and is associated with the encapsulated package of the CPU and a metal slug thermally attached to the CPU package. The heat sink is originally derived from a metal layer of a computer keyboard. The metal layer of the computer keyboard is a surface which is opposite a surface upon which a plurality of user-activated keys are arranged. In addition to the keyboard metal layer, the heat sink includes a heat pipe thermally coupled to the keyboard metal layer.

The present invention further contemplates a heat transfer slug. The heat transfer slug (or heat slug) includes a base and preferably a pair of apertures formed through the base. The apertures are adapted for receiving screws necessary for attaching, either directly or indirectly, the base to an encapsulated CPU. The heat slug further includes a protrusion which extends from a portion of the base. The protrusion includes a substantially flat edge at the side of the protrusion. The protrusion edge is adapted for abutment against, and thermal coupling with, a heat sink.

The present invention still further contemplates a method for assembling a portable computer. The method comprises connecting a CPU upon a planar surface of a printed circuit board and connecting the printed circuit board within a portable computer housing. A heat transfer slug is then thermally coupled to the CPU. The heat slug includes a slug flat edge extending perpendicular to the printed circuit board's planar surface. A computer keyboard is then provided having a planar metal layer on one side of the computer keyboard. A vacuum sealed heat transfer vessel is then thermally coupled to the metal layer of the computer keyboard. The vessel includes a vessel flat edge extending perpendicular to the keyboard metal layer. The metal layer is then disposed substantially parallel to the motherboard's planar surface. While maintaining a spaced distance between the metal layer and the motherboard, a computer keyboard is assembled upon the computer housing by laterally moving the keyboard above to the motherboard's planar surface. Movement of the keyboard causes movement of the vessel flat edge against the slug flat edge thereby completing attachment of the computer keyboard to the portable computer housing at the same time that the thermal transfer circuit is formed.

BRIEF DESCRIPTION OF THE DRAWINGS

Other objects and advantages of the invention will become apparent upon reading the following detailed description and upon reference to the accompanying drawings in which:

FIG. 3b is an isometric view of a palm rest;

FIG. 3c is a detailed view along area 3c of FIG. 3a;

FIG. 4b is a detailed view along area 4b of FIG. 4a;

FIG. 5b is a detailed view along area 5b of FIG. 5a;

FIG. 6 is a cross-sectional view along plane 6—6 of FIG. 4a; and

FIG. 7 is a cross-sectional view along plane 7—7 of FIG. 5a.

While the invention is susceptible to various modifications and alternative forms, specific embodiments thereof are shown by way of example in the drawings and will herein be described in detail. It should be understood, however, that the drawings and detailed description are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
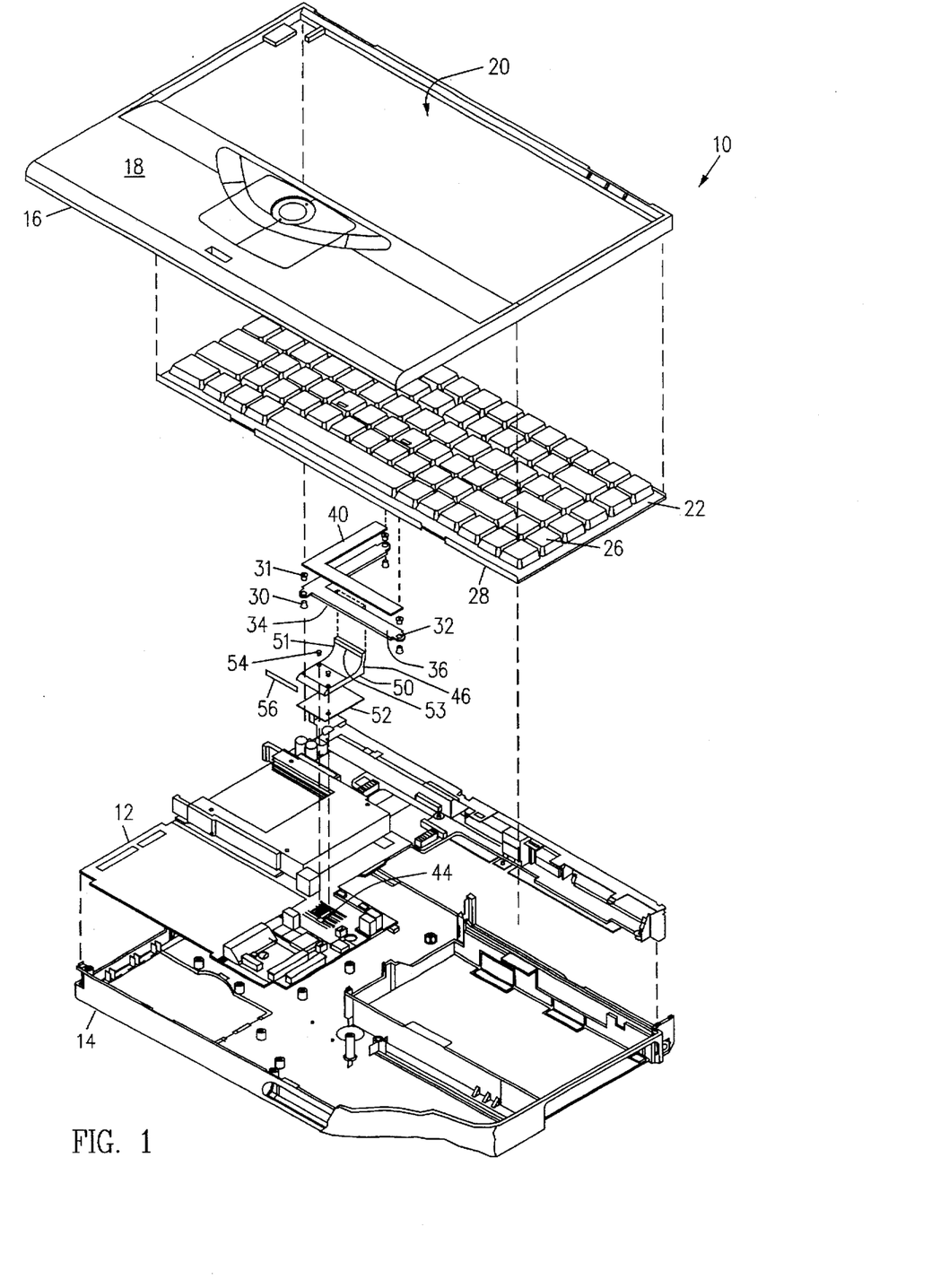
FIG. 1 is an exploded, top-side isometric view of a portable computer having incorporated therein a heat exchange system of the present invention.

Turning now to the drawings, FIG. 1 illustrates an exploded, top-side isometric view of a portable computer 10. Portable computer 10 is herein defined as a minicomputer-type digital computer having numerous integrated circuits arranged upon a printed circuit board or motherboard. Motherboard ("board" 12) is also used to structurally house hard drives, floppy drives, and various other peripheral units normally associated with an AT-compatible minicomputer system. Board 12 is shown in FIG. 1 having receptors which couple onto mating receptors arranged upon or within a portable computer base 14.

Configuration of base 14 as well as board 12 are dependent upon the various applications and capabilities of the computing device. Generally speaking, board 12 includes any single, double, or multi-layered board having printed conductors placed upon or within the board material. Board 12 is designed to receive and electrically interconnect, through the printed conductors, separately manufactured electrical components, including a CPU, RAM, ROM, and I/O controllers. Base 14 is made of any rigid material which is easily and cost effectively shaped to receive board 12. Base 14 includes a lower surface designed to reside upon a working surface, such as a desk or a user's lap. The upper portion of base 14 is designed not only to receive board 12, but also to receive a palm rest housing 16. Base 14, board 12 and palm rest housing 16 are shown in FIG. 1 as having various mechanical structures which depict how they might be interconnected as a single portable computer unit. For the sake of clarity and brevity, various coupling structures and subcomponents shown in FIG. 1 and throughout the drawings which do not impart understanding to the present invention are not denoted with reference numerals. However, it is understood by a skilled artisan how those structures would appear and function to not only provide assembly of a portable computer but allow coupling of peripheral devices within that portable computer.

Palm rest housing 16 comprises an upper surface 18 upon which a user's palms can rest while entering data. Configured within palm rest housing 16 is an opening 20 into which a computer keyboard 22 can be placed. Keyboard 22 is inserted, during assembly, within opening 20 and secured therein by the perimeter of palm rest opening 20. The upper surface of keyboard includes a plurality of keys 26 which allow strike entry of numerical codes, numbers, plain text or a combination of the above. On a surface of keyboard 22 opposing keys 26 is a substantially planar metal layer 28. Metal layer 28 (clearly shown in FIG. 2) includes two or more holes within the layer, formed by a tooling mechanism. Each hole (shown in FIG. 2 as reference numeral 29) is configured to receive an eyelet 31, wherein the hole and eyelet are dimensioned to thereafter receive a screw 30 rotatably inserted through an aperture 32 of a heat exchange device (or "heat pipe") 34.

Heat pipe 34 is designed having a substantially planar surface 36 which, when coupled via screws 30, provides maximum surface area contact between heat pipe 34 and metal layer 28. Surface 36 thereby maximizes heat transfer between heat pipe 34 and metal layer 28. Instead of being circular in cross-section, heat pipe 34 is designed having a cross-section that is either semi-circular, arcuate bound by two perpendicular flat surfaces or, preferably, rectangular. To enhance thermal conductivity between surface 36 and surface 28, a thermally conductive, pliant member 40 is coupled therebetween. Pliant member 40 can be made of any thermally conductive material, a suitable material being Thermagon T-Pli 220 material obtainable from Thermacore, Inc. of Lancaster, Pa.

Heat pipe 34 generally comprises a thermally conductive metallic vessel (i.e., copper vessel) sealed about a heat exchange fluid. The vessel draws vaporized fluid away from the heat input area to a heat exchange area within the vessel. A wick structure returns the condensed fluid from the heat exchange area to the heat input point, thus expelling in the process an amount of heat equal to or greater than the fluid's heat of vaporization. The heat exchange process (vaporization/condensation) is facilitated by the vacuum seal obtained by the vessel. The wick structure comprises any porous member, and the working fluid includes any fluid having a suitable heat of vaporization. An example of a suitable fluid for the present application is water.

Figure 2:
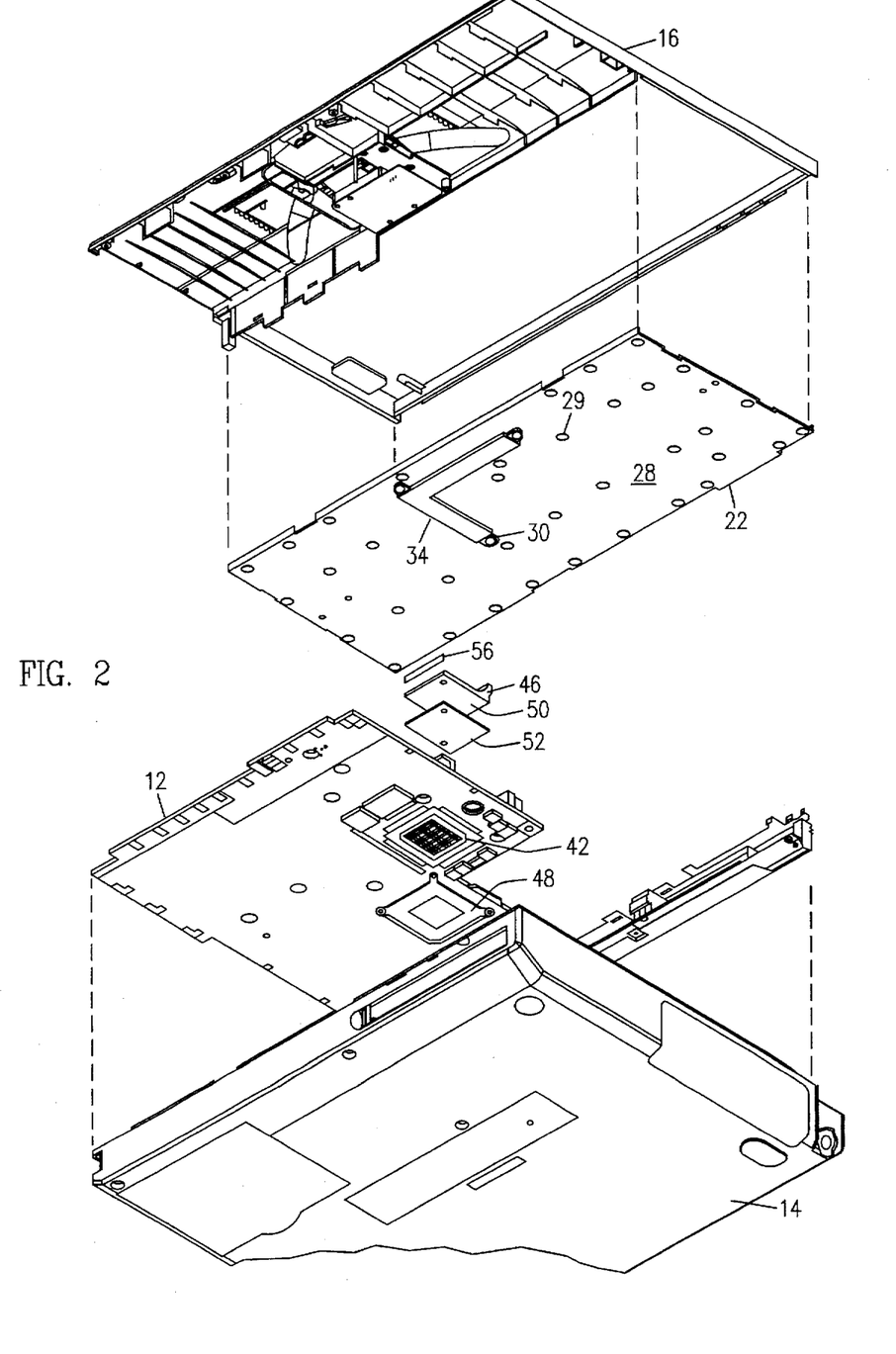
FIG. 2 is an exploded, bottom-side isometric view of a portable computer having incorporated therein a heat exchange system of the present invention.

Heat pipe 34 is used to draw heat from the heat source of a thermal transfer circuit, described hereinbelow as a circuit which is rendered thermally conductive at the completion of computer keyboard 22 assembly upon base 14. As the thermal transfer circuit is formed during keyboard assembly, it will be understood that a thermal transfer circuit is completed. The thermal transfer circuit includes components listed in FIGS. 1 and 2, and includes a heat source (CPU integrated circuit 42) thermally connected to a field of vias 44 which extend through board 12 to a thermally coupled heat slug 46. A lead guard 48 is shown in FIG. 2 dimensioned to cover CPU 42 mounted on the bottom-side surface of board 12. Heat pipe 34 is used to draw heat from the heat source thermally coupled upon an outer surface of the heat pipe vessel to a heat sink also thermally coupled upon the heat pipe a spaced distance from the heat source. CPU 42 is mounted in accordance with well-known surface mount techniques, and is thereby preferably housed within a tape carrier package. Each via of the field of vias 44 is formed according to a plated-through hole (PTH) technique having a thermally conductive material extending along the plated holes formed entirely through board 12. The plated material is a thermally conductive material, a suitable material being, for example, electroplated copper, aluminum or solder. Vias 44 thereby function to draw thermal energy away from CPU 42, through board 12 and into heat slug 46.

Heat slug 46 is made from a thermally conductive material such as aluminum. Heat slug 46 includes a substantially flat base surface 50 which is coupled in thermal contact with a thermally conductive, pliant member 52 made preferably from the same material used in forming pliant member 40. Slug 46 is coupled, with pliant member 52, to board 12 using screws 54. Once coupled, a thermal path is formed between CPU 42 and slug 46 with minimum thermal gradient formed along that path.

Heat slug 46 includes a base surface 50 (shown in FIG. 2) and a protrusion 51 (shown in FIG. 1). Protrusion 51 includes a side portion 53 which is substantially flat and extends along the entire width of slug 46 perpendicular to base surface 50 and board 12. Side portion 53 is designed to receive a thermally conductive, pliant member 56. Pliant member 56 is made of the same material used in forming pliant members 40 and 52. Pliant member 56 is removeably secured between side portion 53 of slug 46 and, upon assembly of portable computer 10, a side surface of heat pipe 34. Advantageously, heat slug 46 is thermally coupled through abutment of side portion 53 to a side surface of heat pipe 34, as will be described in further detail in reference to the remaining figures.

Figure 3A:
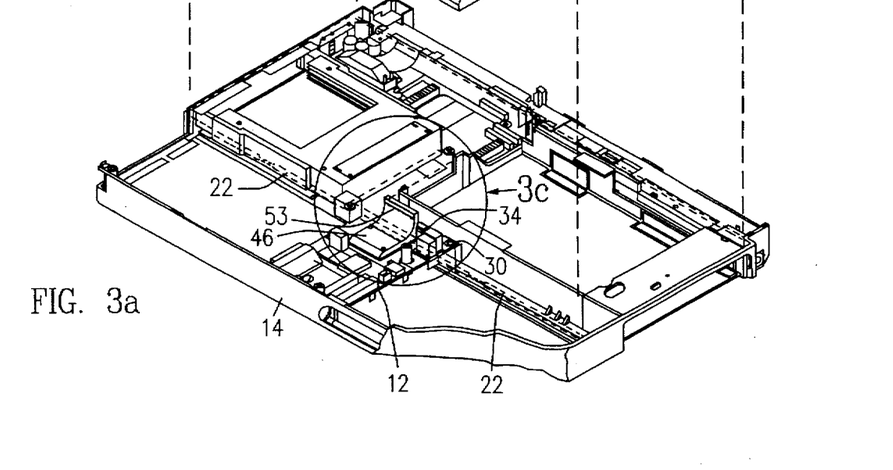
FIG. 3a is an isometric view of a heat slug mounted upon a motherboard connected within a computer housing, and further illustrating a computer keyboard-mounted heat exchange vessel (shown in phantom) brought in registry with the heat slug.

Turning now to FIG. 3a, an isometric view of heat slug 46 is shown mounted upon board 12 configured within base 14. Mounting is achieved by rotating screws 54 through apertures of slug 46 and into mounting holes formed within board 12. Keyboard 22 is shown in phantom as being placed upon a portion of base 14. Keyboard 22 is placed a spaced distance above board 12 with metal layer 28 facing downward toward base 14. Further shown in phantom is heat pipe 34 mounted upon the metal layer-embodied keyboard. Heat pipe 34 extends toward board 12 in lateral alignment with side portion 53 of heat slug 46.

Figures 3B, 3C:
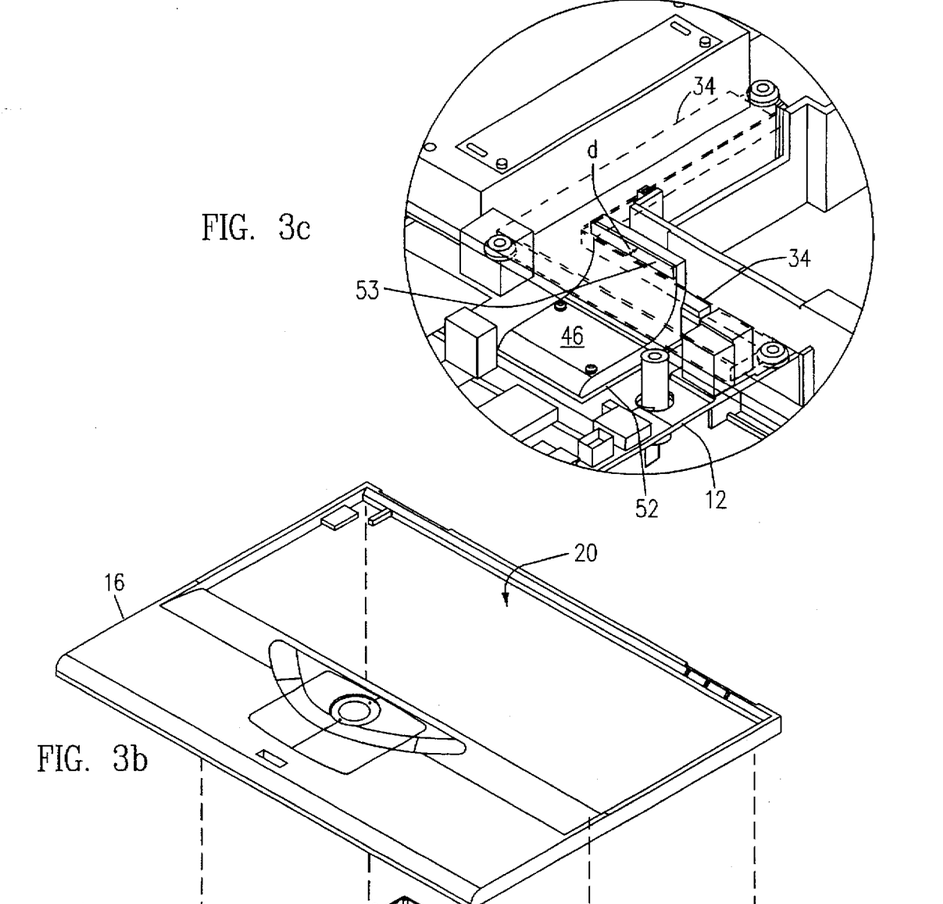

FIG. 3b illustrates palm rest housing 16. Palm rest housing 16 is shown having opening 20 which fits over keyboard 22 shown in phantom in FIG. 3a. As will be described in further detail below, palm rest housing 16 sits over keyboard 22 and, upon lateral movement of palm rest housing 16, keyboard 22 reciprocates laterally causing abutment, through a pliant member 56, of a side surface of heat pipe 34 to side portion 53 of heat slug 46. FIG. 3c illustrates in further detail heat slug 46 coupled onto board 12, and pliant member 52 interposed therebetween. Side portion 53 is shown a spaced distance d from a side surface of heat pipe 34. Distance d will subsequently be closed, as described below, when computer keyboard 22 is fully assembled in a latched position upon base 14.

Figure 4A:
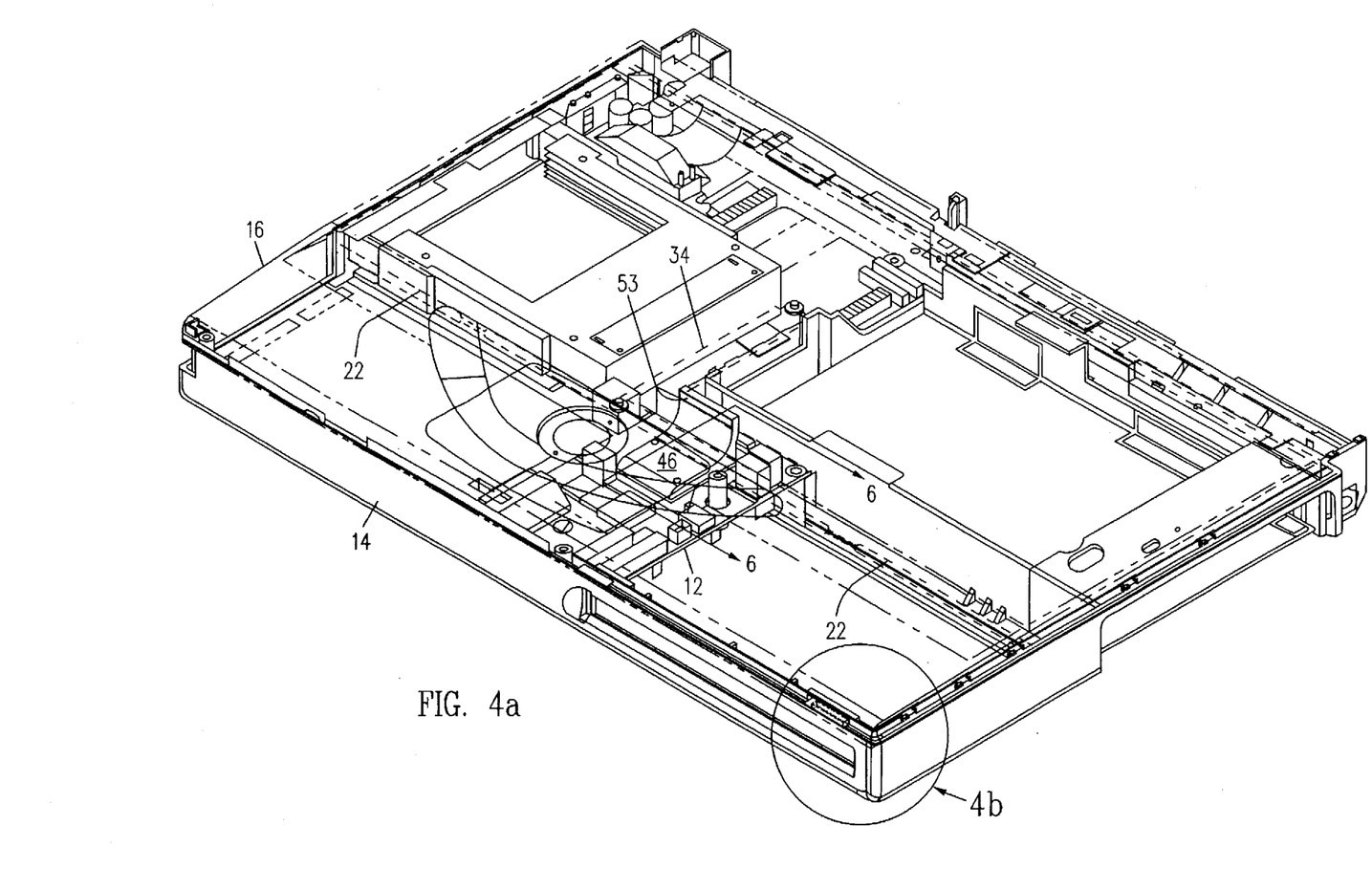
FIG. 4a is an isometric view of the palm rest (shown in partial phantom) brought in registry over a keyboard (also shown in phantom) prior to complete assembly of the keyboard to the computer housing.
Figure 4B:
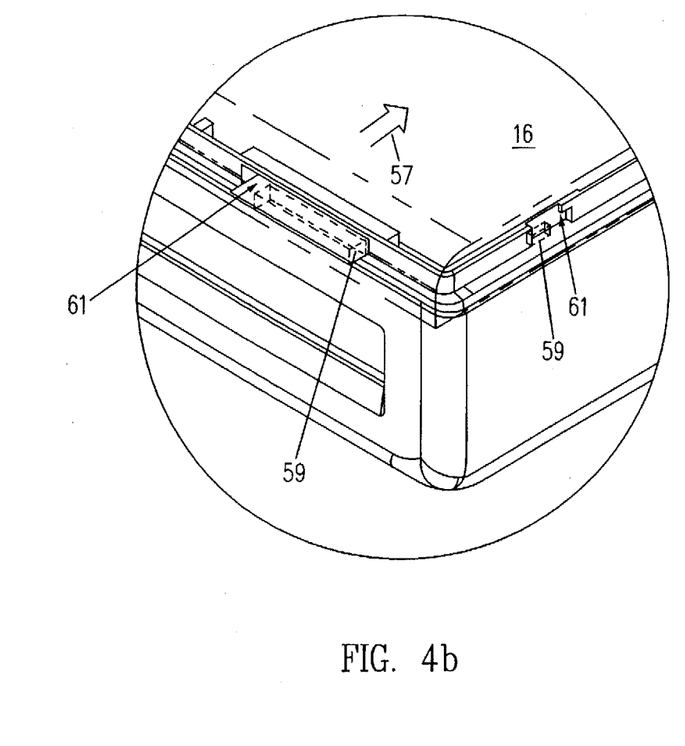

Turning now to FIG. 4a, an isometric view of palm housing 16, shown in partial phantom, is provided in registry over keyboard 22, also shown in phantom. FIG. 4a illustrates the configuration of portable computer 10 at a time just prior to snap fitting (via lateral movement) of keyboard 22 in its permanent position upon base 14. Specifically, FIG. 4a illustrates a distance between side portion 53 and a side surface of heat pipe 34. Palm rest housing 16 provides retainage of computer keyboard 22. As shown in FIG. 4b, which is a detailed view along area 4b of FIG. 4a, movement of palm rest housing 16 in the direction of arrow 57 causes snap fitting of palm rest housing 16 as well as the securement of retained keyboard 22 to an assembled, fixed position. Snap fitting is carried out by mating retainers 59 within grooves 61. Retainers 59 are formed upon an inward-facing surface of palm rest housing 16, and grooves 61 are formed upon the outer surface of base 14.

Figure 5A:
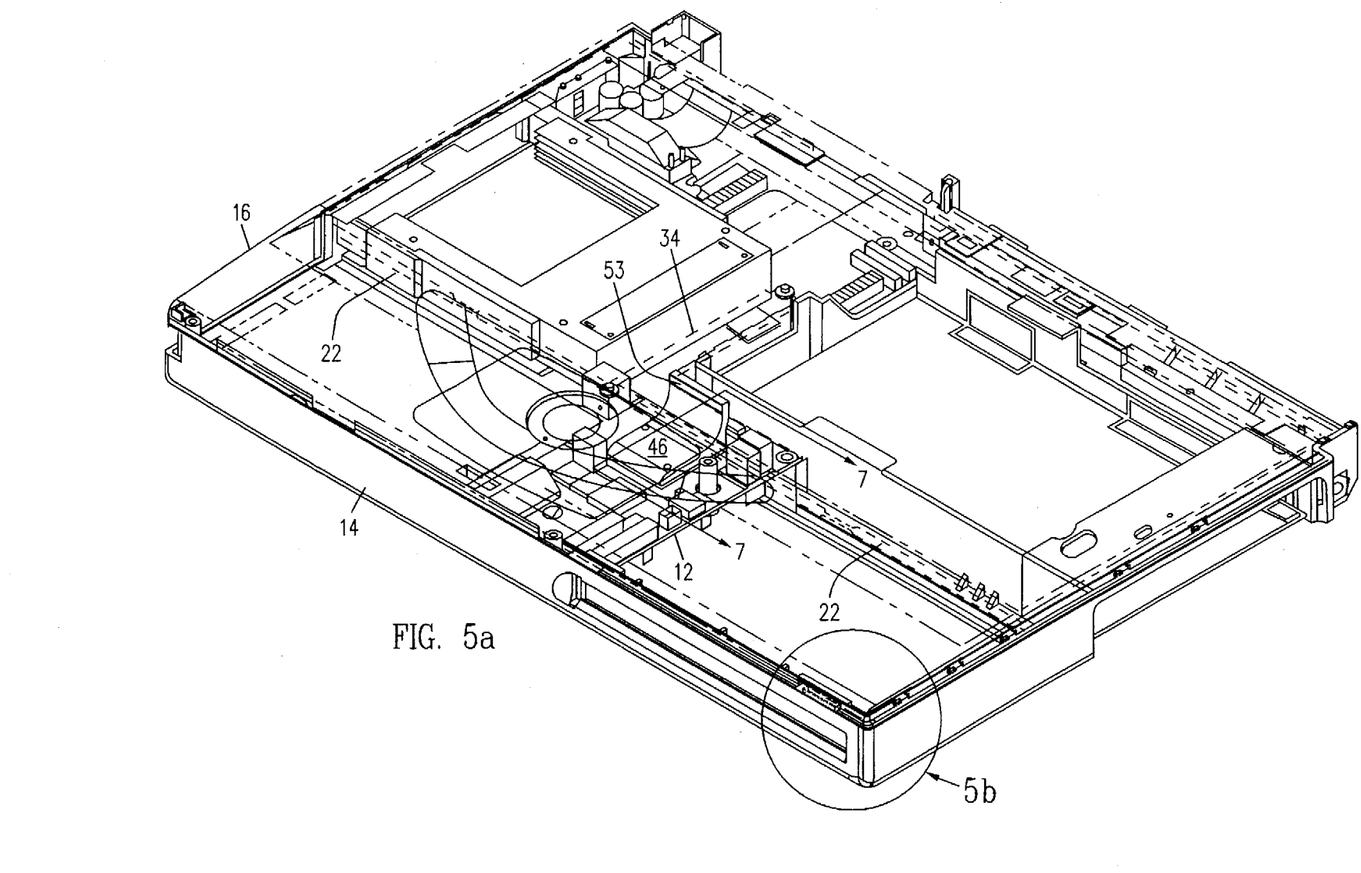
FIG. 5a is an isometric view of the palm rest (shown in partial phantom) brought in registry over a keyboard (also shown in phantom), wherein the palm rest and keyboard have been laterally translated relative to the computer housing to complete the assembly of the keyboard to the computer housing.
Figure 5B:
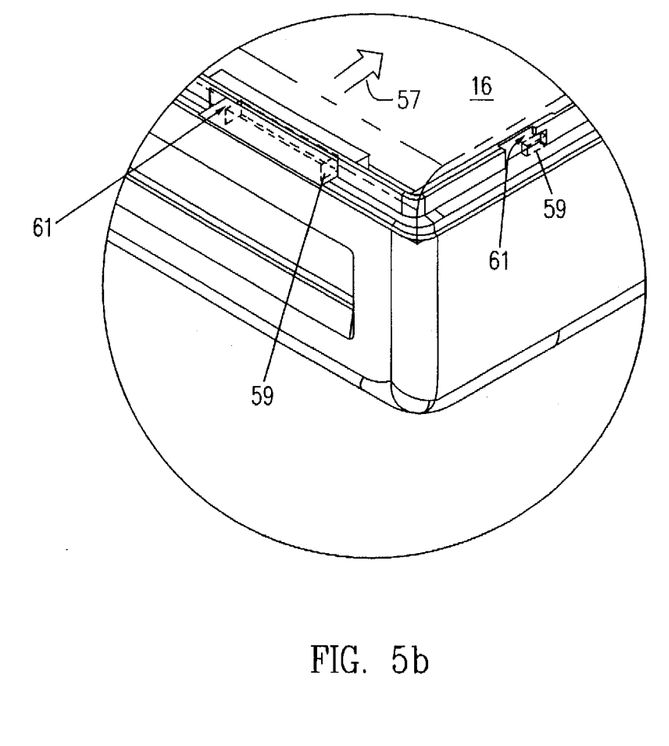

Shown in FIGS. 5a and 5b, rearward-directed pressure in the direction of arrow 57 of palm rest housing 16 causes snap fitting of retainers 59 within grooves 61. Further, snap fitting of retainers 59 to grooves 61 allows abutment and thermal coupling of side surface 53 with a side portion of heat pipe 34. Accordingly, distance d does not appear in FIG. 5a. FIG. 5a is identical to FIG. 4a in structure, but illustrates rearward directed movement and latching of palm rest housing 16 to base 14 as well as thermal coupling between the keyboard and the CPU.

Figure 6:
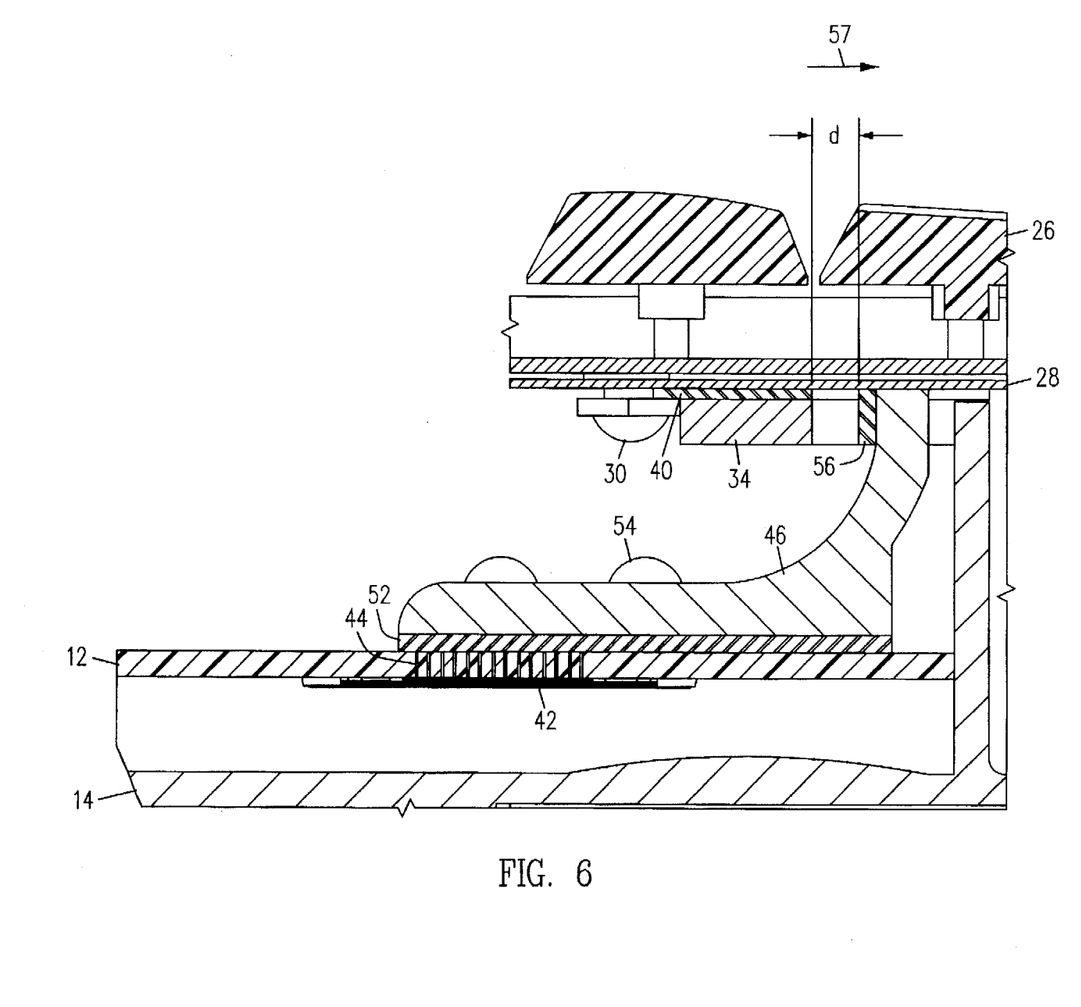
Figure 7:
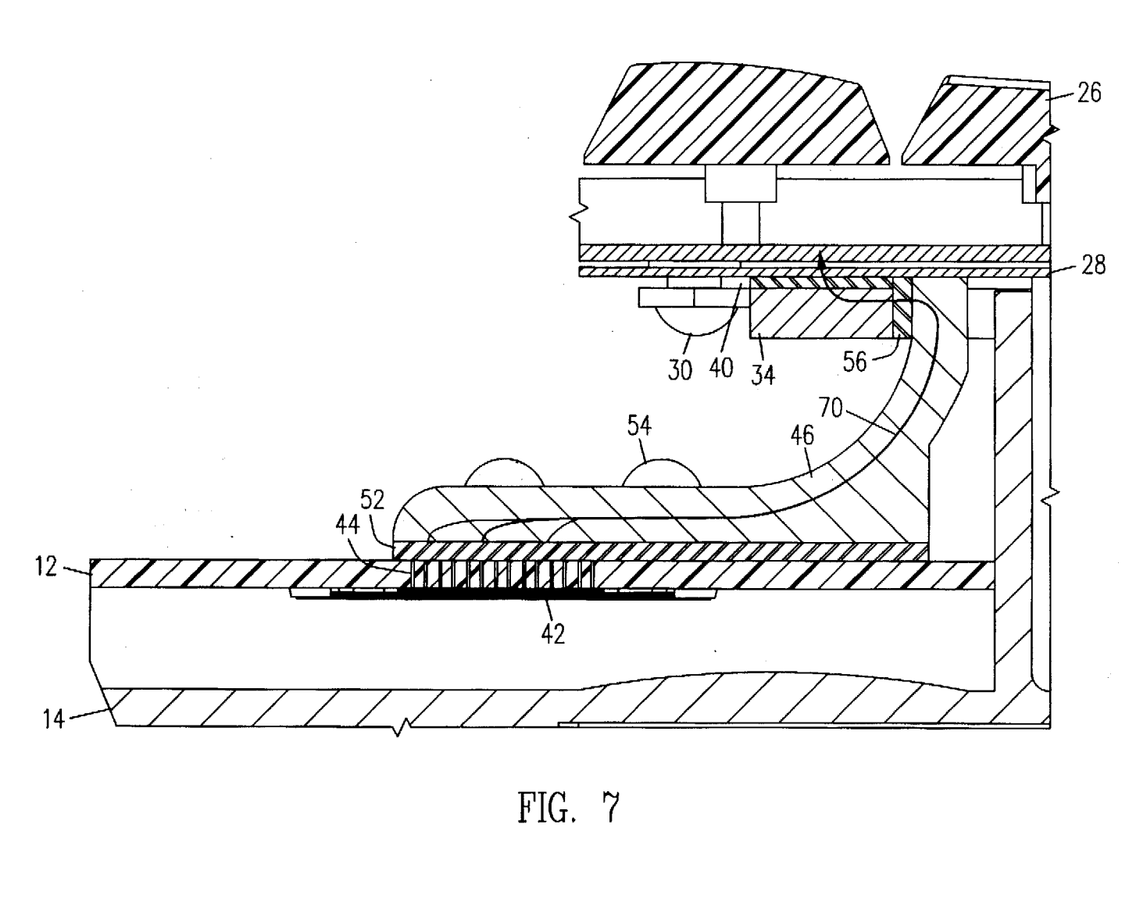

FIGS. 6 and 7 illustrate in further detail completion of the thermal transfer circuit resulting from completed keyboard-to-base assembly. FIG. 6 illustrates relative positions of side portion 53 and heat pipe 34 along section 6—6 of FIG. 4a. FIG. 7 illustrates relative positions of side portion 53 and heat pipe 34 at final assembly shown along section 7—7 of FIG. 5a. Side portion 53 is shown in FIG. 6 spaced a distance d in lateral alignment and in registry with heat pipe 34. Movement of heat pipe 34 in direction 57 resulting from keyboard assembly caused distance d to approach zero, and finally achieve no spacing between side portion 53 and heat pipe 34. Final assembly and abutment of respective side portions is shown in FIG. 7. Accordingly, FIG. 7 illustrates a completed thermal transfer circuit extending from CPU 42, through field of vias 44, through pliant member 52, through heat slug 46, through pliant member 56, through heat pipe 34, through pliant member 40 and finally into the metal layer 28 at the backside surface of keyboard 22. Metal layer 28 is shown in partial cross-section extending across a substantial portion if not all of keyboard 22 backside surface. The completed thermal path formed by thermal coupling of the various components is shown by reference numeral 70 in FIG. 7. Thus, path 70 illustrates completion of the thermal transfer circuit from a heat source to a heat sink.

It will be appreciated to those skilled in the art having the benefit of this disclosure that this invention is capable of applications with portable computers, and specifically computers with advanced CPUs which operate at high processing speeds, at lower voltage levels and using enhanced 32-bit or higher bus structures. Furthermore, it is to be understood that the form of the invention shown and described is to be taken as various exemplary preferred embodiments. Modifications and changes may be made without departing from the spirit and scope of the invention as set forth in the claims. It is intended that the following claims be interpreted to embrace all such modifications and changes and, accordingly, the specification and drawings are to be regarded in an illustrative means rather than a restrictive sense.

What is claimed is:

1. A system for cooling a computer, comprising:
    a heat source connected to a printed circuit board arranged within a computer housing, said heat source including a heat slug thermally coupled to an array of vias extending through said printed circuit board between said heat slug connected on one side of said board and an encapsulated central processing unit (CPU) connected on the other side of said board;
    a heat sink connected upon a computer keyboard; and
    said heat source and said heat sink are arranged in lateral alignment with each other, whereby a side portion of said heat source thermally couples in abutment with a side portion of said heat sink during times in which said computer keyboard is moved during assembly in a lateral direction relative to said computer housing.

2. The system as recited in claim 1, wherein a vertically extending side of said heat slug comprises said side portion of said heat source.

3. The system as recited in claim 1, wherein said heat sink comprises a metal surface of said computer keyboard, wherein said metal surface is disposed opposite a surface upon which a plurality of user-activated keys are arranged.

4. A system for cooling a computer, comprising:
    a heat source connected to a printed circuit board arranged within a computer housing;
    a heat sink connected upon a computer keyboard; and
    said heat source and said heat sink are arranged in lateral alignment with each other, whereby a side portion of said heat source thermally couples in abutment with a side portion of said heat sink during times in which said computer keyboard is moved during assembly in a lateral direction relative to said computer housing
    wherein said heat sink comprises a heat pipe thermally coupled to a metal backside surface of said computer keyboard.

5. The system as recited in claim 4, wherein a vertically extending side of said heat pipe comprises a side portion of said heat sink.

6. The system as recited in claim 4, wherein said heat pipe comprises a vacuum sealed chamber containing a wick and a heat exchange fluid.

7. A method for assembling a portable computer, comprising:

connecting a central processing unit (CPU) upon a planar surface of a printed circuit board and connecting said printed circuit board within a portable computer housing;

thermally coupling a heat transfer slug to said CPU, said heat slug having a slug flat edge extending perpendicular to said board planar surface;

providing a computer keyboard having a planar metal layer on one side of said computer keyboard;

thermally coupling a vacuum sealed heat transfer vessel to said metal layer, said vessel having a vessel flat edge extending perpendicular to said metal layer; and disposing said metal layer substantially parallel to said board planar surface and, while maintaining a spaced distance between said metal layer and said board, assembling said computer keyboard upon said computer housing by thereafter moving said metal layer relative to said board planar surface whereby said slug flat edge is brought in thermal contact with said vessel flat edge.

8. The method as recited in claim 7, wherein the step of moving said metal layer comprises laterally moving said metal layer relative to said board planar surface.

9. The method as recited in claim 7, wherein said slug flat edge and said vessel flat edge extend in lateral registry toward each other.

10. The method as recited in claim 7, wherein said first thermally coupling step comprises a screw attaching said heat transfer slug to said CPU with a compliant, thermally conductive material and an array of thermally conductive vias disposed between said heat transfer slug and said CPU.

11. The method as recited in claim 10, wherein each of said array of vias are spaced from each other within the array and all of said array of vias extend through said printed circuit board between said compliant material and said CPU.

12. The method as recited in claim 11, wherein said CPU is encapsulated within an electrically insulative and thermally conductive package.

13. The method as recited in claim 7, wherein said second thermally coupling step comprises screw attaching said heat transfer vessel to said metal layer with a compliant, thermally conductive material disposed therebetween.

14. A computer system comprising a computer housing;

a computer keyboard coupled to the computer housing;

a printed circuit board arranged within the computer housing;

a central processing unit (CPU) connected on one side of the printed circuit board;

a heat source connected to the printed circuit board, the heat source including a heat slug thermally coupled to an array of vias extending through the printed circuit board between the heat slug connected on one side of the board and the CPU connected on the other side of the board;

a heat sink connected upon the computer keyboard; and the heat source and the heat sink being arranged in lateral alignment with each other, whereby a side portion of the heat source thermally couples in abutment with a side portion of the heat sink during times in which the computer keyboard is moved during assembly in a lateral direction relative to the computer housing.

\* \* \* \* \*